July 22, 1958  R. L. CARROUCHE  2,843,936
RULING ENGINE
Filed Dec. 13, 1954  2 Sheets-Sheet 1
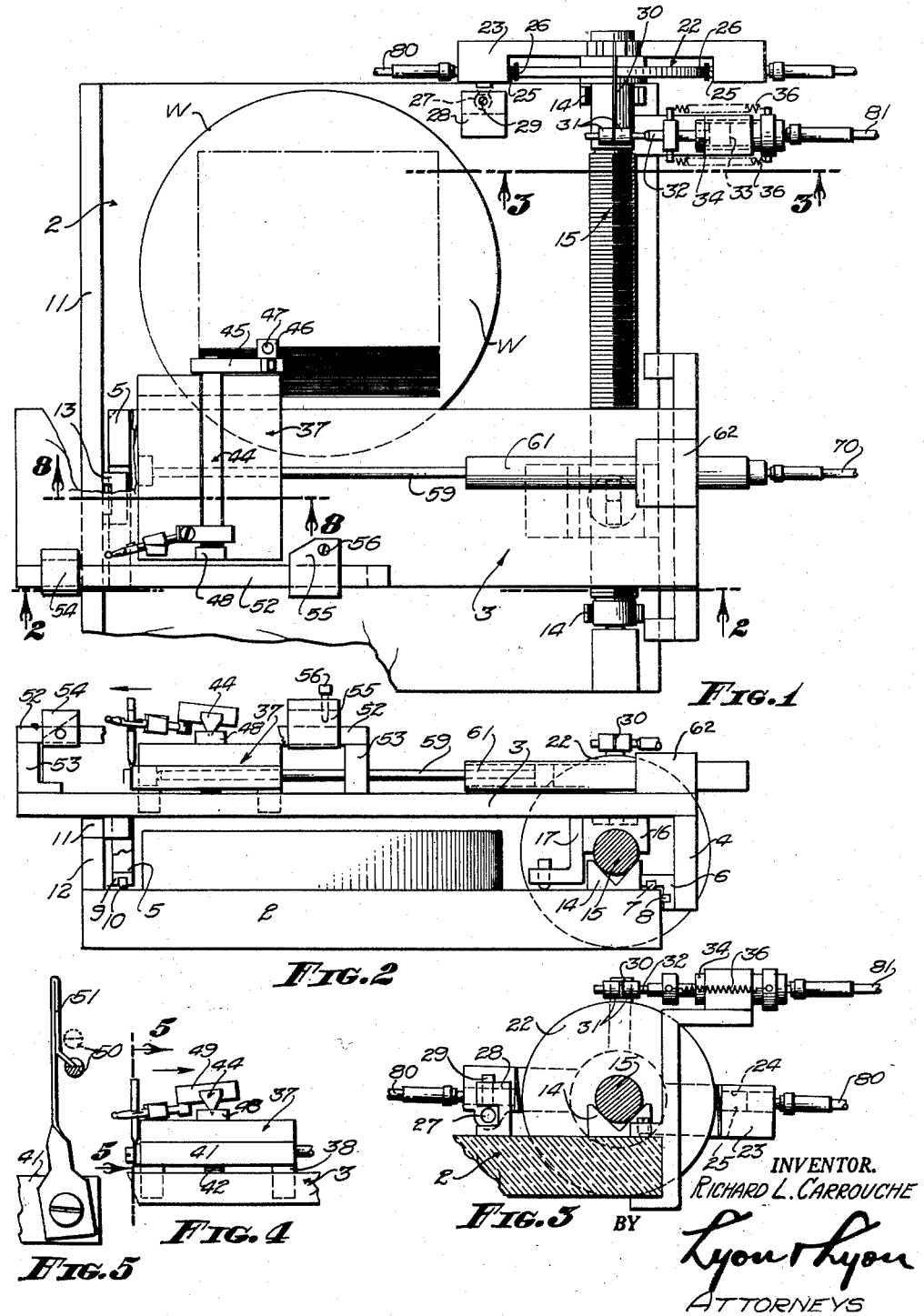
INVENTOR.
RICHARD L. CARROUCHE
BY Lyon & Lyon
ATTORNEYS INVENTOR.
RICHARD L. CARROUCHE
BY
Lyon & Lyon
ATTORNEYS

United States Patent Office 2,843,936
Patented July 22, 1958

2,843,936

RULING ENGINE

Richard L. Carrouche, Pasadena, Calif., assignor to California Institute Research Foundation, Pasadena, Calif., a corporation of California Application December 13, 1954, Serial No. 474,731

3 Claims. (Cl. 33—32)

My invention relates to ruling engines, that is to a machine for producing the extremely fine and precise grooves of a diffraction grating.

A typical diffraction grating is formed on optically flat glass which has been coated with aluminum about one-ten thousands of an inch thick. In this aluminum layer are ruled tiny, shallow grooves of saw-tooth profile; for example, 14,400 per inch. These must be parallel, uniform in depth and width, and equally spaced to the almost impossible tolerance of one-millionth of an inch.

Heretofore, the problem has been approached by constructing the ruling engine of massive parts, and operating the engine in a vibration free and temperature constant environment. Designers in the field of ruling engines recognize seven fundamental problems:

(1) Friction.—An adequate oil film while producing uniform friction, varies in thickness and introduces serious errors; whereas boundary lubrication; i. e., oil films only a few molecules thick, is extremely difficult to maintain. (2) Wear.—Wear of the engine parts—to produce one fair size grating, the engine carriage must reciprocate some 150,000 times. (3) Warpage.—The internal stresses in hard metal introduce warpage in time no matter how perfect the parts may be initially. (4) Creep.—A gradual and permanent deformation that takes place in metal over long periods. (5) Vibration.—Vibration causing movement of the diamond stylus in excess of one millionth of an inch will affect a diffraction grating. (6) Dust.—Conventional ruling engines employ such close tolerances that the finest dust between the parts will throw the engine off. (7) Temperature.—The most meticulous control of temperature must be maintained in order that the required accuracy be maintained.

Accordingly then, I include in the objects of my invention:

First, to provide a ruling engine wherein friction is minimized and held to a uniform value, and wherein wear is minimized by employing glass-to-graphite bearing surfaces, the glass surfaces are polished and optically flat and the loads between the moving parts are held to a minimum.

Second, to provide a ruling engine wherein by the use of glass for critical parts, warpage and creepage and temperature effects are held to a minimum; and in particular, formation of optically flat glass surfaces are relatively easy to produce and maintain.

Third, to provide a ruling engine which, contrary to previously established practice, need not be constructed of massive parts or require massive foundations; and which is particularly compact in proportion to the size of grating produced so that the problems of damping vibration are minimized.

Fourth, to provide a ruling engine wherein the major components merely rest in position and may be easily separated simply by lifting one part from the other so that repair and maintenance is simplified.

Fifth, to provide a novel operating mechanism for ruling engines wherein the power source may be remotely located, and the elements of the operating mechanism located on the ruling engine are inherently free of vibration.

With the above and other objects as may appear hereinafter, reference is directed to the accompanying drawing in which:

Figure 1 is a top or plane view of my ruling engine.

Figure 2 is a transverse, sectional view thereof through 2—2 of Figure 1.

Figure 3 is a fragmentary, transverse, sectional view through 3—3 of Figure 1.

Figure 4 is a fragmentary view of the transverse carriage taken in the same plane as Figure 2 and showing the parts in the position assumed during the return stroke of the transverse carriage.

Figure 5 is an enlarged fragmentary, sectional view through 5—5 of Figure 4 showing the latch member.

Figure 6:
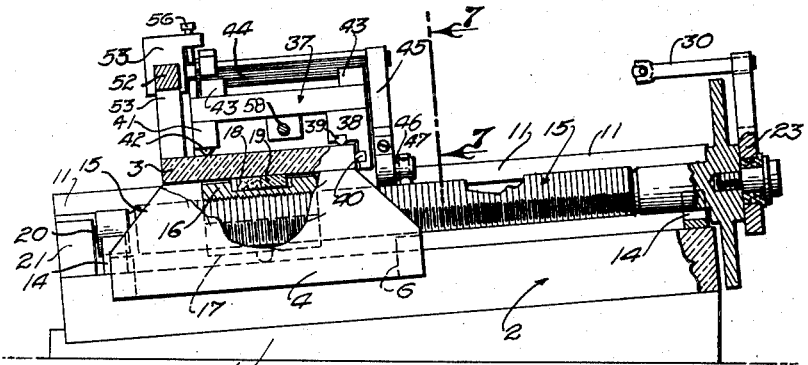
Figure 6 is a side elevational view of my ruling engine with portions broken away and in section.

My ruling engine is mounted on a base 1 which is preferably inclined as shown in Figure 6 and which, in turn, is mounted on a suitable support so arranged as to introduce a minimum of vibration.

Set on the base 1 is a bed 2 in the form of a glass block.

The surfaces or at least the essential surfaces of the bed 2 are ground and polished until optically flat. Mounted over the bed 2 is a carriage 3 formed of a rectangular glass plate, the wearing surfaces of which are optically flat.

The carriage is provided with a pair of spaced supporting plates 4 and 5, likewise of glass. These are cemented to the carriage. The supporting plate 4 overlies one inclined margin of the base 1 and is provided with a pair of bearing mounts 6 in the form of angle members. The bearing mounts are spaced from each other and are provided with graphite bearings 7 and 8 which are arranged to bear on the upper and side surfaces of the glass bed 2 so as to support the corresponding end of the carriage 3 against downward and lateral displacement. The supporting plate 5 is located near the opposite end of the carriage 3 and its lower face is provided with a bearing mount 9 carrying a graphite bearing 10.

Near the adjacent margin of the bed 2 is a rail 11 formed of magnetizable material supported from the bed 2 by posts 12. Secured under the carriage 3 is a small permanent magnet 13 which is attracted toward the rail 11 so as to exert a lateral force holding the graphite bearing 8 in contact with the opposite vertical urge of the bed 2.

The upper and lower ends of the bed 2 adjacent to the margin engaged by the bearings 7 and 8 are provided with aligned V blocks 14 which journal the ends of a lead screw 15. The lead screw is preferably formed of glass and provided with extremely uniform screw threads of fine pitch. Set on the lead screw 15 is a half nut 16 which preferably overlies several screw threads so that any irregularities are averaged out. The half nut is provided with a laterally directed bearing bracket 17 which rests on the top of the bed 2 to prevent rotation of the half nut. The half nut is provided with a drive block 18 on its upper surface which engages a depending driven block 19 cemented to the under side of the carriage 3 as shown best in Figure 6.

The drive and driven blocks constitute the only connection between the lead screw and the carriage and are maintained in contact only by the gravitational force exerted by reason of the inclined position of the lead screw. It will be observed that the lead screw tends to move downwardly on the bed 2 and is restrained by a thrust bearing 20 mounted in a block 21 cemented to the lower margin of the glass bed 2.

The lead screw may be formed of metal having a low coefficient of thermal expansion; however, it is preferred to form the lead screw of glass and form the half nut of graphite.

Secured to the upper end of the lead screw 15 is a disc 22. Journalled thereto and relative to the lead screw preferably on a graphite bearing is a rocker arm 23. The extremities of the rocker arms overhang the periphery of the disc 22 at diametrically opposing sides and form cylinders 24 in which are mounted clamping pistons 25 adapted to be urged against leaf springs 26 secured to the extremities of the rocker arm and arranged to bear yieldingly against the disc 22.

One extremity of the rocker arm is provided with a pin 27 extending parallel to the lead screw 15. Cemented to the bed 2 is a stroke limiting stop bracket 28 having a channel which receives the pin 27 and a set screw 29 which limits the movement of the pin within the channel and consequently limits the arcuate movement of the rocker arm 23.

The rocker arm is provided with an upwardly extending post to which is secured a spring arm 30 extending over the disc 22. The spring arm is adapted to be engaged by adjustable collars 31 mounted at the extremity of a drive rod 32. The drive rod is connected to a piston 33 moveable in a cylinder 34 supported by a mounting bracket 35 from the bed 2. Reciprocation of the drive rod and lateral movement of the spring arm 30 in turn causes the rocker arm 23 to oscillate. The spring arm allows for over travel of the drive rod and the piston. Movement in one direction is effected by pressure fluid in the cylinder 34 as will be described hereinafter and return movement is effected by springs 26.

Mounted on the carriage 3 is a cross feed carriage 37 formed likewise of a glass plate. The cross feed carriage is provided with a pair of spaced supporting blocks 38 which overhang the upper margin of the carriage 3 and are provided with graphite bearings 39 and 40.

Figures 7, 8:
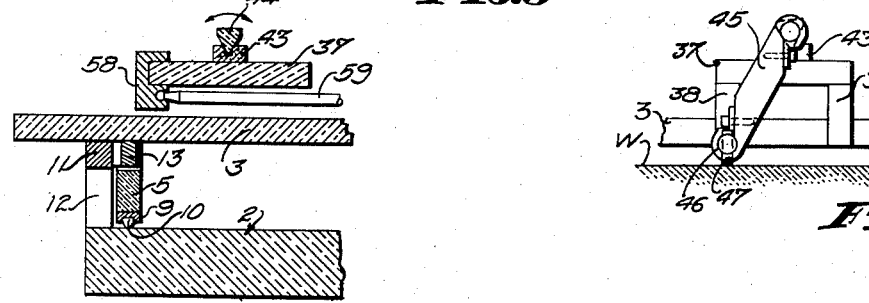
Figure 7 is a fragmentary, partial sectional, partial elevational view taken along the line 7—7 of Figure 6 showing particularly the ruling stylus.
Figure 8 is a fragmentary sectional view through 8—8 of Figure 1.
Figure 9:
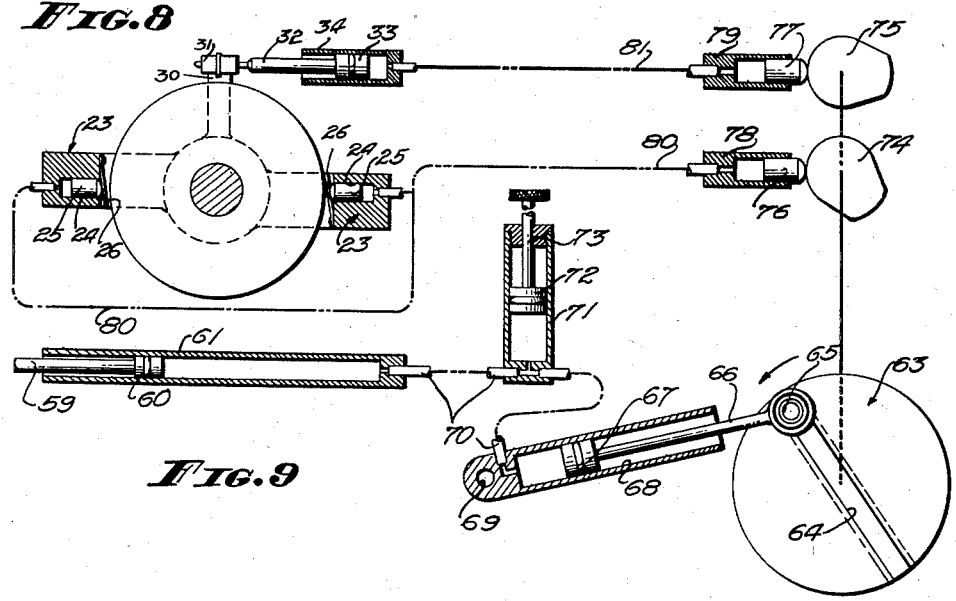
Figure 9 is a diagrammatical view showing the manner in which the ruling engine is driven.

Adjacent to the opposite or lower margin of the carriage 3, the cross feed carriage 37 is also provided with a supporting block 41 with a graphite bearing 42 resting on the upper surface of the carriage 3. Mounted on the cross feed carriage 37 parallel with the lead screw 12 is a pair of V blocks 43 preferably formed of graphite. These blocks support a rocker bar 44 formed of glass and of V-shaped cross section. As shown best in Figure 8, the V-angle of the blocks 43 is greater than the V-angle of the rocker bar 44 so that the rocker bar is capable of limited oscillation. The upper extremity of the rocker bar 44 is provided with an arm 45, the lower end of which is provided with a stylus support 46 which carries a stylus 47 equipped with a diamond point. The diamond point of the stylus 47 is adapted to ride on a work piece W. The work piece may be a glass block, its upper surface ground optically flat and provided with a thin (in the order of one-ten-thousandths) coating of metal such as aluminum. The work piece rests on the glass bed 2 or may be temporarily cemented thereto. The forces exerted in the work piece are so slight that a mere stop to prevent downward movement on the sloping glass bed 2 is all that is needed.

The opposite end of the rocker arm from the stylus 47 engages a thrust bearing 48 which may be a small graphite block cemented to the cross feed carriage. Cemented on the rocker bearing 44 is a rocker beam 49 having a small laterally directed arm 50. The arm is adapted to be engaged by a vertically extended spring latch member 51 secured to the side of the cross feed carriage and when so engaged the rocker bar is tilted so as to cause the stylus 47 to clear the work piece. When the arm 50 is free of the latch 51, the stylus engages the work piece. Mounted along the lower margin of the carriage 3 adjacent to the arm 50 is a rail 52 supported on posts 53. Mounted on the rail 52 are trip cam blocks 54 and 55. The trip cam block 54 is shaped and positioned so as to engage the extremity of the arm 50 as the stylus approaches the end of its cutting stroke so as to deflect the arm 50 downward and cause it to be engaged by the latch 51.

The other trip cam block 55 is provided with a cam portion which engages the upper end of the latch 51 to force the latch free of the arm 50. The trip cam block 55 is provided with a stop screw 56 which engages a stop cam 57 mounted on the arm 50. The stop screw is so adjusted that it engages the stop cam 57 immediately before the diamond point of the stylus 47 touches the work piece. The slope of the stop cam 57 is such that as the stylus begins its operating stroke, the stop screw allows the stylus tip to gradually come into contact with the work piece.

Mounted under the cross feed carriage 37 is a connecting block 58 which receives the end of a stem 59 attached to a plunger 60 moveable in a cylinder 61. The cylinder 61 is secured by a mounting block 62 to the carriage 3.

Located at a point remote from the ruling engine is a drive wheel 63 operated by a suitable electric motor. The drive wheel is provided with a transverse way 64 in which is mounted a crank element 65, the throw of which may be adjusted. The crank element 65 is provided with a connecting rod 66 which operates a piston 67 mounted within a cylinder 68. The cylinder 68 is mounted on a pivot 69 so as to oscillate with rotation of the drive wheel. The cylinder 68 is connected by a hydraulic line 70 to the cylinder 61 on the carriage 3. Interposed in the hydraulic line may be a reservoir 71 and the volume of which may be adjusted by a plunger 72 mounted on a screw threaded stem 73. Driven from the same shaft as the drive wheel 63 is a pair of cams 74 and 75, the cams are engaged by cam follower pistons 76 and 77 mounted in cylinders 78 and 79 which are connected by hydraulic lines 80 and 81 respectively to the cylinders 24 and 34.

Operation of my ruling engine is as follows:

The work piece W is suitably located on the glass bed 2 and held there by wax or the like. The carriage and its lead screws are positioned so that the stylus is located at the lowermost margin of the area on which the diffraction grating is to be formed. The stroke of the cross feed carriage 37 is adjusted by adjusting the position of the crank element 65 on the drive wheel 63. The starting position of the stylus is adjusted by varying the position of the reservoir plunger 72. The amount of feed introduced by the lead screw is adjusted by the set screw 29 which engages the pin 27 of the rocker arm 23. After these adjustments are made the machine is started by rotating the driving wheel 63 which causes the cross feed carriage 37 to move back and forth.

During movement in one direction the stylus engages the work piece and during movement in the opposite direction the stylus clears the work piece. During the return movement of the stylus while clear of the work piece, the lead screw 15 is rotated slightly by movement of the drive rod 32 against the spring arm 30 which tilts the rocker arm 32. This movement is transmitted to the lead screw 15 through the disc 22 by causing the cylinders 24 to press the springs 26 against the periphery of the disc 22.

Before the drive rod 32 retracts, the cylinders 24 release the springs 26 so that return movement of the rocker arm 26 to its initial position does not affect the setting of the lead screw. This operation is repeated in timed sequences to the movement of the cross feed carriage.

By reason of the fact that virtually all wearing parts are made of glass or graphite, it has been found possible to make an extremely small and compact ruling engine in which the mass of the parts is reduced to a minimum. The result is that wear of the parts becomes negligible.

Furthermore because the glass bed, lead screw carriage and cross feed carriage are all formed of glass and such glass may be selected so as to have the same co-efficient of expansion as the glass block constituting the work piece, it follows that temperature effects are almost eliminated. Also, because these parts are formed of glass and graphite is employed as the companion material, no oil film is required to reduce friction, and thus the disadvantages of oil film lubrication are completely eliminated. Still further it should be observed that because the parts are formed of glass, the critical surfaces may be optically flat or in the case of the screw threads virtually optically perfect and remain so without elastic deformation or creep.

It will be observed that for its size the ruling engine is capable of handling a relatively large work piece. For example, a ruling engine having a bed of approximately 10" on the side can produce a diffraction grating in excess of 4" on the side.

It should be observed that while a magnetic means is shown for the carriage 3 in its "in" position, gravitational force may be employed to hold the lead screw, cross feed carriage and rocker bar in position. Still further the springs or other yieldable means exerting a light but constant force may be employed for this purpose.

Having thus described my invention, I do not wish to be limited thereto but desire to include in the scope of my invention all novelty inherent in the appended claims.

I claim:

1. A ruling engine, comprising: a bed, a first carriage having slide bearings resting on said bed; a second carriage having slide bearings resting on said first carriage for movement in a direction transverse to the first carriage; lead screw bearings on said bed; a lead screw resting on said screw bearings; a traveler resting on said lead screw and connected with said first carriage; drive means for intermittently advancing said lead screw to advance said first carriage; drive means for reciprocating said second carriage in a direction transverse to the first carriage; a ruling stylus carried by said second carriage for engagement with a work piece; said bed and carriages being formed of glass and having optically flat bearing ways for engagement by said slide bearings, said lead screw and said carriage drive means including piston and cylinder driven units, remote piston and cylinder driving units and liquid filled connecting tubes whereby said driving units may be positioned in a region remote from said driven units.

2. A ruling engine, comprising: an optically flat bed having a workpiece supporting area and an inclined axis; a lead screw mounted along one margin of the bed and extending in the direction of the inclined axis thereof; a base carriage disposed transversely of the inclined axis of said bed and resting thereon; means carried by said base carriage engageable with said lead screw to advance said carriage along the axis of said lead screw as said lead screw is turned, the inclination of said bed establishing a constant biasing force resisting movement of said base carriage therealong; means also exerting a constant biasing force on said base carriage in a direction perpendicular to said lead screw; a cross carriage adapted to rest by gravity against a side of said base carriage; means for reciprocating said cross carriage on said base carriage; means for intermittently turning said lead screw; and a stylus carried by said cross carriage and positioned for movement on said workpiece as said cross carriage is reciprocated.

3. A ruling engine as set forth in claim 2 wherein: the cross carriage reciprocating means, and lead screw turning means, includes piston and cylinder driven units, remotely located piston and cylinder drive units, and flexible liquid filled connecting tubes for transmitting movement from said drive units to said driven units.

References Cited in the file of this patent

UNITED STATES PATENTS

| 561,677 | Littlehales | June 9, 1896 |
| 564,636 | Nouel et al. | July 28, 1896 |
| 1,062,580 | Bollee | May 27, 1913 |
| 2,575,367 | Strong | Nov. 20, 1951 |
| 2,648,573 | Wheildon | Aug. 11, 1953 |

FOREIGN PATENTS

| 480,332 | Great Britain | Feb. 21, 1938 |

OTHER REFERENCES

Ingalls: "Ruling Engines," Scientific American Magazine, pages 45–50, 52, and 54, June 1952, vol. 186, No. 6.